United States Patent [19]

Duvall et al.

[11] 4,073,639

[45] Feb. 14, 1978

[54] METALLIC FILLER MATERIAL

[75] Inventors: David S. Duvall, Cobalt; William A. Owczarski, Cheshire; Daniel F. Paulonis, Moodus; Robert P. Schaefer, East Hartford, all of Conn.

[73] Assignee: United Technologies Corporation, Hartford, Conn.

[21] Appl. No.: 744,539

[22] Filed: Nov. 24, 1976

Related U.S. Application Data

[62] Division of Ser. No. 538,618, Jan. 6, 1975, Pat. No. 4,008,884.

[51] Int. Cl.$^2$ ............................................ B23K 35/22
[52] U.S. Cl. ................................................... 75/.5 R
[58] Field of Search ............... 75/.5 R, .5 AA, .5 BA; 228/119

[56] References Cited

U.S. PATENT DOCUMENTS

| | | | |
|---|---|---|---|
| 3,322,546 | 5/1967 | Tanzman et al. | 75/.5 R |
| 3,539,192 | 11/1970 | Prasse | 75/.5 R |
| 3,632,319 | 1/1972 | Hoppin et al. | 228/194 |
| 3,700,427 | 10/1972 | Hoppin et al. | 75/.5 R |

*Primary Examiner*—W. Stallard
*Attorney, Agent, or Firm*—Charles E. Sohl

[57] ABSTRACT

In filling voids in or between metallic articles, as in the repair of cracks or other surface defects in castings, the void is filled with a powder mix which upon heat treatment fills the void. The filler powder mix is a blend of at least two distinct powder components and in terms of overall composition preferably corresponds to that of article being repaired. The components comprising the mix are selected to provide a transient liquid phase and isothermal resolidification of a portion of the mix at the temperature below the article melting point. A subsequent heat treatment is preferably utilized for homogenization.

7 Claims, No Drawings

METALLIC FILLER MATERIAL

This is a division of appication Ser. No. 538,618, filed Jan. 6, 1975, now U.S. Pat. No. 4,008,884.

BACKGROUND OF THE INVENTION

The present invention relates in general to metallic filler materials and bears a peripheral relationship to the diffusion bonding arts.

Frequently expensive gas turbine engine components, such as superalloy turbine blades and vanes, are found with small defects resultant frm the casting processes or develop small cracks during engine service. Although such defects may be relatively small, they are often sufficient to cause rejection of the component. In many instances, however, the defect is of such a nature that repairs would be satisfactory. However, lacking a suitable means for reliably repairing such defects, these components are often scrapped.

In an attempt to salvage such parts, many repair techniques have been attempted in the past. For example, although repair by fusion welding has occasionally been successful, its success tends to be sporadic, and the welding technique itself often produces additional cracking due to the typical high crack sensitivity of the cast superalloys.

Brazing procedures have also been utilized in attempts to repair defective turbine components. One method has been to simply flow molten braze material into an existing crack. Unfortunately, this technique has been particularly unsuccessful because of unremoved oxides or other contaminants in the cracks or because tight or partially closed crevice areas have prevented a complete fill with braze material. In such cases, although the cracks may be sealed at the surface, no assurance can be provided that subsurface cracks will be sealed as well. This is, of course, not only detrimental but difficult to detect as well.

A more satisfactory approach to component repair is to first eliminate the cracks by mechanically routing out the entire defective area and then refilling it. However, when braze alloys are employed as the filler for such relatively large volumes, upon solidification they often form quantities of eutectic phases which are weak, brittle and prone to adverse selective oxidation during subsequent component service.

Although the desirability of effecting component repairs has long been evident, it is apparent that no satisfactory repair techniques exist, particularly where such repairs can be effected reproducibly and reliably.

SUMMARY OF THE INVENTION

The present invention relates to compositions and techniques for filling void volumes in or between metallic articles, as in the repair or joining of such articles.

It contemplates a metallic filler material mix comprising a blend of particulate matter having an overall composition substantially corresponding to that of the articles being repaired or joined. The mix is a blend of at least two distinct particulate components selected to provide a transient liquid phase of at least a portion of the mix and isothermal resolidification at a temperature below the melting point of the articles.

In one embodiment of the invention the particulate components making up the mix comprise a first component whose composition corresponds substantially to that of the metallic article being joined and a second component having the same basis as the metallic composition and doped with a substantial amount of boron as a temperature depressant. The powder mix is packed into the void to be filled and the article is heated to a temperature near but below the solidus temperature of the article. At this temperature the second particulate component (herein referred to as the TLP alloy) causes the formation of a temporary liquid phase from a portion of but not all of the mix. Continued exposure of the part to the above temperature results in resolidification of the liquid phase due to diffusion of the temperature depressant both into the article and into the particles of the first component. Subsequent heat treatment causes homogenization of the material in the now filled area. The repaired component mauy then be given any further prescribed treatment or processing necessary for its use or return to service.

DESCRIPTION OF THE PREFERRED EMBODIMENTS

In the U.S. Pat. No. 3,678,570 to Paulonis et al, of common assignee herewith, it is disclosed that diffusion bonds can be reliably made between superalloy components under circumstances where fusion welding, brazing or other joining techniques are unsatisfactory or unfeasible. The bonds made utilizing the teachings of the patent, can be, at the completion of processing, indistinguishable from the substrates. Usually however, the homogenization process proceeds in the solid state and, to permit processing in a reasonable time, joint gaps are kept very thin to minimize the diffusion distances required for homogenizaton to occur.

The basic interlayer alloy material utilized by Paulonis et al is specially selected to melt at the bonding temperature and subsequently isothermally solidify, by an interdiffusion mechanism. The presence of this transient liquid phase is utilized to fill the gaps which may remain in the bond area assuring the complete contact necessary for diffusion bonding and homogenization to occur. The presence of such a liquid is almost a necessity, and certainly so for most repairs where irregular shapes are involved, such as the repair of cracks and casting defects.

Particularly in hardware scheduled for use in sensitive and demanding applications, in order to make successful repairs, the filler material used to fill the machined repair area should be compatible with and, most preferably, very similar in composition and capable of assuming a similar microstructure to the base material being repaired. The interlayer alloys used for transient liquid phase bonding (TLP alloys), as disclosed in Paulonis et al can be advantageously utilized in the present invention because they involve compositions tailored to the substrates.

The present invention, therefore, contemplates the use of TLP alloy powders. The void area where the repair is to be made will be filled with powders, including TLP powders, in a mix whereby a portion of the fill mix temporarily melts and then isothermally, or substantially so, resolidifies. This isothermal resolidification eliminates the formation of the deleterious eutectic phases present in braze repairs. Subsequent diffusion produces further homogenization of the repaired region such that its composition and microstructure can approach that of the material being repaired.

The typical TLP interlayer alloy composition includes a substantial quantity of boron as a melting point depressant. Although other melting point depressant materials such as silicon are known, boron is particularly advantageous for use in the bondng or repair of the superalloys. Boron is capable of rapid diffusion into the superalloys and the isothermal solidification of the transient liquid phase occurs because the melting point depressant diffuses from the melt into the undoped substrate, reducing the quantity available in the melt to the point where solidification occurs although the temperature has remained constant.

In filling a repair area of substantial volume, the total quantity of boron present in the repair powders, if all TLP alloy is used, and the limited substrate area available to the liquid and acting as sink for the temperature depressant, would require an unreasonably long time for isothermal solidification to occur. Furthermore, the total quantity of temperature depressant present might be sufficiently high to cause an adverse change in the properties of the substrate.

In the most preferred embodiment of the present invention, TLP interlayer alloy powders are thoroughly blended with powders substantially corresponding to the base metal composition form a repair powder mix. The presence of the base metal powders in the mix now provide another sink for the boron, in addition to the solid substrate, and isothermal solidification of the melt can more readily occur.

Certain criteria must obviously be established in determining the mix proportions and quantity and nature of the temperature depressant therein. In form and amount sufficient temperature depressant must be present to provide a liquid phase at the desired bonding temperature. The quantity of the liquid phase must be such as to provide assurance that all of the powder interstices and the entire repair area is filled to provide a void-free finished joint. On the other hand, it is normally not advantageous to provide so much interlayer alloy that the entire mix liquefies, except for very small areas, and the total temperature depressant content cannot be so large as to adversely affect the properties of the substrate being repaired.

A number of other factors also affect the nature and quantities of components in the mix. Generally speaking, powder particle size in the mix does not appear particularly critical. Diffusion distances will normally be less with fine powders and, thus, homogenization is simplified. Greater packing densities will generally be obtained utilizing a distribution of particle sizes. As previously mentioned, complete liquefication of the mix is usually not desired and, therefore, the mix should be such that some portion of the distributed particles of the base material ingredient in the mix remains unmelted.

Generally speaking, also, the quantity of boron in the mix determines the amount of liquid which will be generated in the transient liquid phase. Obviously enough liquid must be present to sufficiently fluidize the mix in the sense of filling all the pores. On the other hand, it generally is desirable to use as little boron as is necessary to do the job.

Mixes having a high base metal/TLP powder ratio have been used as previously indicated forming a rather viscous paste at temperature. In some cases, an externally applied pressure has been utilized to insure that all voids have been filled, particularly where the mix results in a viscous mass during the transient liquid phase. This high base metal/TLP alloy radio mix insures not only that residual unmelted base alloy particles will remain during the transient melting phase but also provides the closest end match insofar as repair area/substrate composition identity is concerned.

In most instances and particularly for low base metal/TLP alloy mix ratios, a distribution of particle sizes has been used with the size of the base metal particles exceeding that of the TLP alloy particles. A distribution of particle sizes generally results in a higher packing density than single regular-shaped particles, and the larger size of the base metal particles increases the assurance that a distribution of unmelted base metal will remain during the transient liquid phase.

Another factor determining the nature and composition of the mix may be the end application of the component itself or possibly the location of the repair area therein. In a critical area of a sensitive component, essentially complete homogenization and development of a repaired area composition and microstructure essentially corresponding to the component composition and microstructure may be absolutely essential. In a noncritical region or a less sensitive component a much lesser degree of composition and microstructure matching may be perfectly satisfactory. Further, a greater or lesser degree of substrate sensitivity to property impairment due to the temperature depressing element, and the acceptable limits thereof, will be a function of alloy composition and intended component usage. The presence or absence of this sensitivity may well dictate the care which must be exercised in formulating the mix.

For repair of the superalloys, preferably the TLP alloy is employed in the form of homogeneous powder. This powder comprises an alloy substantially corresponding in composition to at least the major constituents of the substrate material, excluding therefrom any elements known to form deleterious phases which may interfere with character of the finished repair area, and typically containing 1–3 percent boron, as the temperature depressant element. This TLP powder is thoroughly blended with the correct proportion of homogeneous metal powder of the substrate material composition, forming the filler powder mix. Substrate powder/TLP powder ratio of 2-9/1 have been used. This filler powder mix is placed in the void to be filled and the component is heated to the bonding temperature. When the TLP powder melts, it wets and flows around the base metal powder particles and throughout the repair area, completely filling it. The remaining, unmelted substrate powders assist and accelerate the isothermal solidification by acting, as previously described, as local diffusion sinks for the melting point depressant (e.g. boron) in the TLP alloy. Once the repair area has completely solidified, the substrate metal powders further aid in subsequent homogenization by providing shortrange distances for mutual diffusion between materials of the TLP and substrate metal compositions. At completion of the homogenization cycle, the surface of the component can be restored to its desired contour by any convenient means and the componenet can be given any prescribed heat treatments or other processing in preparation for its use or return to service.

As normally practiced, powders of the base metal composition in the mix have typically been about the exact composition, and powders of the TLP alloy have been formulated to a somewhat simpler chemistry, but based on the substrate alloy composition. When a high base metal/TLP alloy powder mix ratio is used, the final composition in the repaired area will very closely correspond to the composition of the base metal except for a slightly higher local boron content.

At lower base metal/TLP powder mix ratios, particularly when using relatively simple TLP alloy chemistries, the resultant repaired area will tend to be somewhat less homogeneous. And this may be perfectly satisfactory in most instances. For very sensitive applications, it has been found advantageous at the low ratios to overbalance the base metal composition in one or more of those constituents of the substrate metal which are for one reason or another not provided in the TLP alloy. For example, in repairing a component whose composition includes nickel, chromium, tungsten, aluminum, titanium and other ingredients using a relatively simple TLP alloy composition including nickel, chromium, tungsten and boron, the base metal powders have included a quantity of aluminum in excess of that of the substrate metal to compensate for the fact that aluminum was not present in the TLP alloy ingredient.

Throughout the description emphasis has been placed on the use of boron as the temperature depressant. In connection with the repair of the high strength, high temperature alloys, such as the nickel, cobalt and iron base superalloys, boron is normally advantageously used. Silicon, however, is another element that is recognized to have a temperature depressant effect. Boron is normally utilized since in those substrate alloy systems any substantial quantities of borides that are found may, in most instances, be readily eliminated by heat treatment whereas silicides, or other similar compounds may not. In particular alloy systems or in other circumstances where for one reason or another the borides cannot be reasonably eliminated and, particularly where the component will be exposed to a hot oxidizing environment, the presence of the silicide rather than the boride may be advantageous since the silicide is more oxidation resistant. This would normally be an exceptional circumstance, however, since typically homogenization would be most desirable.

Usually the repair powder mix is simply placed in the cavity to be filled. A series of tests, however, have revealed that it is possible to pile the dry powders over the cavity and to flow them into the cavity in the slurry or partially liquefied state at high temperature. Care must be taken, however, that all of the unmelted base metal powder particles, necessary for isothermal solidification in reasonable time frames, are not filtered out in the process. In other words, a mix of unmelted powders and liquid, and not simply liquid itself, is desired in the cavity.

Another technique that has been employed has involved a powder mix presintering step. In this procedure, the loose powders are positioned in the cavity and the component is heated sufficiently to simply sinter the powders sufficiently to form a porous but relatively unitary mass. This may be particularly convenient in facilitating subsequent handling.

As used herein, the term powders will, in general, be used to refer to relatively small size particulate material, not necessarily of regular shape.

Technically, the processing described herein has been considered to fall into two groups. The first group has utilized a mix employing a relatively high base metal/TLP powder ratio (6:1 or higher). When making repairs using powder ratios of this magnitude, externally applied pressures have been employed to minimize the presence of voids in the finished repair area. A repair made using this method will have a microstructure and properties similar to or approaching those of the parent metal.

The second general group utilizes a lower base mtal/TLP alloy powder mix ratio (5:1 or less). An externally applied pressure is typically not required in these cases. For this reason repairs of this type are often simpler to accomplish. However, the repaired region properties may be somewhat lower because of a somewhat higher retained boron content.

In both of the above cases an outgassing of the powders in vacuum prior to the repair in order to remove adsorbed gases has appeared to reduce the tendency for porosity in the repair. Even after the repair has been completed an externally applied pressure, hot isostatic pressing, for example, may be utilized to further close any voids that may remain.

The following examples are illustrative of the invention:

EXAMPLE 1

High quality, fully dense repairs have been made in an alloy of the nominal composition, by weight, consisting of 9 percent chromium, 10 percent cobalt, 12.5 percent tungsten, 1 percent columbium, 2 percent titanium, 5 percent aluminum, 2 percent hafnium, 0.015 percent boron, balance nickel. Base metal powders of the above composition were admixed with a TLP alloy composition of the composition, by weight, consisting of 10 percent chromium, 10 percent cobalt, 5 percent tungsten, 3 percent boron, balance nickel, to form a base metal/TLP alloy powder mix ratio 7–8:1. The base metal powder size was 88 microns and finer and the TLP powder size was 44 microns and finer.

Repairs were made at 2175° F. for 48 hours under an applied pressure of 275 p.s.i.

EXAMPLE 2

Fully dense repairs were also made in the same alloy using the same powder mix ingredients but in a base metal/TLP alloy powder mix ratio of 3:1. After filling the routed-out defect with the powder mix, the assembly was outgassed in vacuum at 1200° F. for about 65 hours and then heated to the bonding temperature of 2175° F. and held for 24 hours, without any externally applied pressure.

Although the invention has been described in detail in connection with certain examples and preferred embodiments, in its broader aspects it is not limited to such details and modifications thereto may be made within the scope of the appended claims without departing from the principles of the invention and without sacrificing its chief advantages.

What is claimed is:

1. A metallic filler material mix for filling cavities in and between metal articles which comprise:
   a first, finely-divided homogeneous particulate component substantially corresponding in composition to that of the metal articles;
   a second, finely-divided homogeneous particulate component having as its basis the same basis metal as that of the articles and containing a melting point depressent such as boron in a quantity substantially exceeding that present in the metal articles;
   the first and second particulate components being intimately blended to form a powder mix which has an overall composition approximating that of the metal articles, a portion of the mix exhibiting a capability of forming a liquid phase while another portion of the mix remains unliquefied at a processing temperature below the melting point of the articles, the mix being characterized by isothermal resolidification at the processing temperature.

2. The filler material mix according to claim 1 wherein:
the ratio, by weight, of the quantity of the first particulate component to the second particulate component in the mix exceeds unity.

3. The filler material mix according to claim 3 wherein:
the ratio of the first component to the second component is 3/1 – 8/1.

4. The filler material mix according to claim 2 wherein:
the ratio of the first component to a second component is sufficiently high to provide sufficient viscosity of the mix at the processing temperature that unmelted particulate matter remains distributed through the mix.

5. The filler material mix according to claim 2 wherein:
the second particulate component contains, by weight, about 1–3 percent boron.

6. The filler material mix according to claim 3 wherein:
the average particle size of the first particulate component exceeds that of the second particulate component.

7. The filler material mix according to claim 3 wherein:
the particulate component have as their basis ingredient nickel, cobalt or iron.

* * * * *